United States Patent
Ma et al.

(10) Patent No.: US 12,021,244 B2
(45) Date of Patent: Jun. 25, 2024

(54) CATHODE INCLUDING BASE-RESISTANT COMPOUND AND LITHIUM-AIR BATTERY INCLUDING THE SAME

(71) Applicant: Samsung Electronics Co., Ltd., Suwon-si (KR)

(72) Inventors: Sangbok Ma, Suwon-si (KR); Mokwon Kim, Suwon-si (KR); Donghwa Seo, Burlington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 137 days.

(21) Appl. No.: 17/110,534

(22) Filed: Dec. 3, 2020

(65) Prior Publication Data

US 2021/0226224 A1   Jul. 22, 2021

Related U.S. Application Data

(60) Provisional application No. 62/963,811, filed on Jan. 21, 2020.

(30) Foreign Application Priority Data

Feb. 21, 2020 (KR) .................. 10-2020-0021771

(51) Int. Cl.
  *H01M 4/86* (2006.01)
  *H01M 4/02* (2006.01)
  *H01M 4/38* (2006.01)
  *H01M 12/08* (2006.01)

(52) U.S. Cl.
  CPC ......... *H01M 4/8663* (2013.01); *H01M 4/382* (2013.01); *H01M 4/8605* (2013.01); *H01M 12/08* (2013.01); *H01M 2004/027* (2013.01); *H01M 2004/8689* (2013.01)

(58) Field of Classification Search
  CPC .................................................. H01M 4/8663
  See application file for complete search history.

(56) References Cited

U.S. PATENT DOCUMENTS

| 6,335,112 B1 * | 1/2002 | Asukabe | ............. H01M 8/1051 |
| | | | 429/535 |
| 8,883,355 B2 | 11/2014 | Inda | |
| 9,966,628 B2 | 5/2018 | Schilm et al. | |

(Continued)

FOREIGN PATENT DOCUMENTS

| EP | 1353391 A1 | 10/2003 |
| JP | 5023936 A | 9/2012 |

(Continued)

OTHER PUBLICATIONS

Patel et al., "Efficient Pourbaix disgrams of many-element compounds", Phys. Chem. Chem. Phys., 2019, 21, 25323.

(Continued)

*Primary Examiner* — Brian R Ohara
(74) *Attorney, Agent, or Firm* — CANTOR COLBURN LLP

(57) ABSTRACT

A cathode for an air battery includes a porous conductive material; and a base-resistant compound on a surface of the porous conductive material, the base-resistant compound having a 0 or positive Gibbs free energy at 2 V to 4.5 V vs Li/Li+ at a pH of about 7 to about 14.

21 Claims, 4 Drawing Sheets

(56) References Cited

U.S. PATENT DOCUMENTS

| | | | |
|---|---|---|---|
| 2013/0059213 A1* | 3/2013 | Tomita | H01M 8/0245 |
| | | | 429/405 |
| 2013/0071761 A1 | 3/2013 | Amine et al. | |
| 2013/0078535 A1 | 3/2013 | Aizawa | |
| 2016/0079590 A1 | 3/2016 | Roev et al. | |
| 2016/0204445 A1 | 7/2016 | Jung et al. | |

FOREIGN PATENT DOCUMENTS

| | | |
|---|---|---|
| KR | 1020130049003 A | 5/2013 |
| WO | 2014020349 A1 | 2/2014 |

OTHER PUBLICATIONS

European Search Report for European Patent Application No. 21151997.0 dated Jun. 15, 2021.

\* cited by examiner

CATHODE INCLUDING BASE-RESISTANT COMPOUND AND LITHIUM-AIR BATTERY INCLUDING THE SAME

CROSS-REFERENCE TO RELATED APPLICATIONS

This application claims priority to and the benefit of U.S. Provisional Application Ser. No. 62/963,811, filed on Jan. 21, 2020, in the US Patent and Trademark Office, and Korean Patent Application No. 10-2020-021771, filed on Feb. 21, 2020, in the Korean Intellectual Property Office, and all the benefits accruing therefrom under 35 U.S.C. § 119, the contents of which are incorporated herein in their entirety by reference.

BACKGROUND

1. Field

This disclosure relates to a cathode including a base-resistant compound, and a lithium-air battery including the same.

2. Description of Related Art

In a lithium-air battery, lithium itself is used as an anode and it is not necessary to store air as a cathode active material in the battery. Thus, a lithium-air battery may be implemented as a high-capacity battery.

In addition, lithium-air batteries have a relatively high theoretical specific energy, which is equal to greater than 3,500 watt hours per kilogram (Wh/kg). Such a specific energy is about 10 times greater than that of a general lithium-ion battery.

In a lithium-air battery, a voltage of about 4.5 V is generated when moisture-containing air is used as a cathode active material, whereas a voltage of about 3 V is generated when oxygen is used as a cathode active material. Accordingly, moisture-containing air is favorably used as the cathode active material.

However, when moisture-containing air is used as the cathode active material, LiOH is generated, which is strongly basic, as a discharge product from a discharge reaction, and materials currently being used as a cathode material, may be undesirably decomposed due to the strongly basic material.

Therefore, there is a need for a cathode material which is electrochemically stable even under a strongly basic condition, and a cathode including the same.

SUMMARY

Provided is a base-resistant cathode.
Provided is a lithium-air battery including the cathode.
Provided is a method of preparing the cathode.
Additional aspects will be set forth in part in the description which follows and, in part, will be apparent from the description.

According to an aspect, provided is a cathode for an air battery, the cathode including:
a porous conductive material; and
a base-resistant compound on a surface of the porous conductive material, the base-resistant compound having a positive Gibbs free energy at 2 V to 4.5 V vs Li/Li$^+$ at a pH of about 7 to about 14.

According to an aspect, provided is a lithium-air battery including:
the cathode;
an anode including lithium; and
an electrolyte disposed between the cathode and the anode.

According to an aspect, provided is a method of preparing a cathode, including the steps of:
providing a composition including a lithium-containing metal oxide and a binder;
molding the composition to prepare a sheet; and
heat-treating the sheet under an oxidizing atmosphere at a temperature of about 900° C. to about 1300° C. to prepare the cathode.

A cathode for an air battery, the cathode including:
a porous conductive material, and
a base-resistant compound on a surface of the porous conductive material, wherein the base-resistant compound includes at least one of $CeO_2$, $Dy_2O_3$, $Er_2O_3$, $Gd_2O_3$, $HfO_2$, $Ho_2O_3$, $Lu_2O_3$, $Nd_2O_3$, $PuO_2$, $Sc_2O_3$, $Sm_2O_3$, $Ta_2O_5$, $Tb_2O_3$, $ThO_2$, $TiO_2$, $Tm_2O_3$, $Y_2O_3$, or $ZrO_2$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
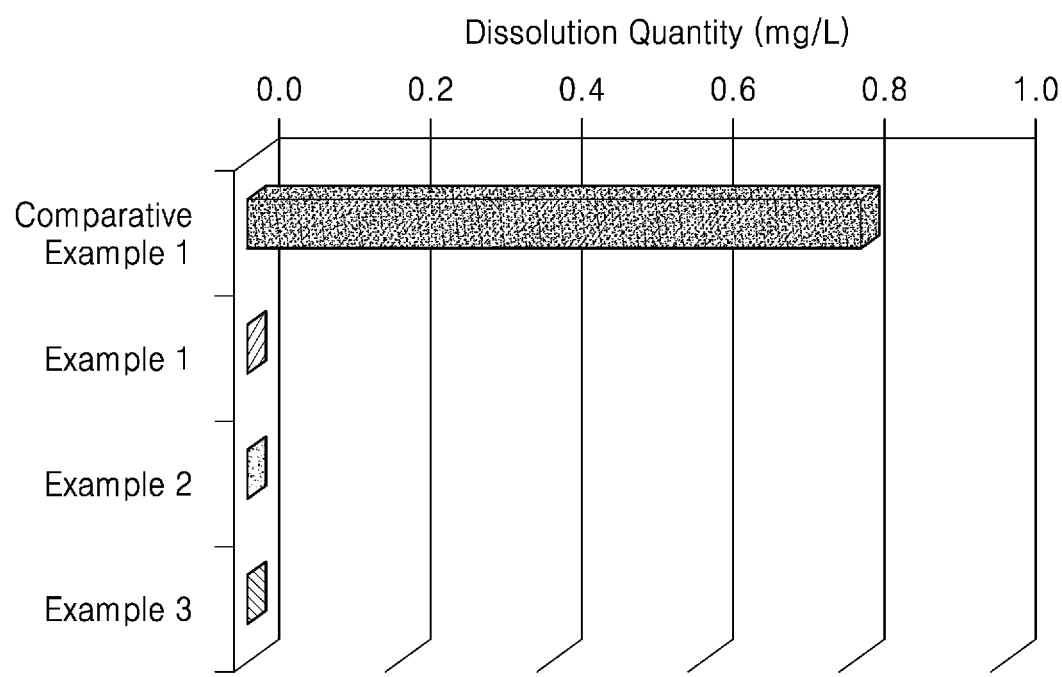
FIG. 1 is a bar graph that illustrates a quantity of metal dissolution (Dissolution Quantity, (milligrams per liter, mg/L)) for cathodes prepared in Examples 1 to 3 and Comparative Example 1 when used as working electrodes in a 1 molar (M) LiOH aqueous solution with a Pt electrode as a counter electrode, when a voltage of 2.8 V vs Li/Li$^+$ is applied for 18 hours.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, as the present inventive concept allows for various changes and numerous embodiments, particular embodiments will be illustrated in the drawings and described in detail in the detailed description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "includes," "have," and "comprise" are intended to indicate the presence of the features, numbers, steps, actions, components, parts, ingredients, materials, or combinations thereof disclosed in the specification, but do not preclude the possibility that one or more other features, numbers, steps, actions, components, parts, ingredients, materials, or combinations thereof may exist or may be added. The symbol "/" used herein may be interpreted as "and" or "or" according to the context.

In the drawings, the diameters, lengths, and thicknesses of layers and regions are exaggerated or reduced for clarity. Throughout the specification, like reference numerals refer to like elements. Throughout the specification, it is to be understood that when a component, such as a layer, a film, a region, or a plate, is referred to as being "on" another component, the component can be directly on the other component or intervening components may be present thereon. Throughout the specification, the terms "first," "second," etc. may be used to describe various elements, these elements, components, regions, layers and/or sections should not be limited by these terms. These terms are only used to distinguish one element from another element.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

Hereinafter, a cathode according to exemplary embodiments, a lithium-air battery including the same, and a method of preparing the same will be described in further detail.

A cathode according to an embodiment uses air including moisture and oxygen as a cathode active material, and includes a base-resistant compound.

In existing lithium-air batteries, when oxygen is used as a cathode active material, $Li_2O_2$ is generated as a discharge product on a surface of a cathode during discharge.

However, in the lithium-air battery including the cathode according to an embodiment, the air including moisture and oxygen is used as a cathode active material, and thus LiOH is generated on a surface of a cathode as a discharge product during discharge. While not wanting to be bound by theory, it is understood that the LiOH is generated by a reaction expressed by Reaction Formula 1:

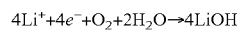

$$4Li^+ + 4e^- + O_2 + 2H_2O \rightarrow 4LiOH \qquad \text{Reaction Formula 1}$$

During discharge of the lithium-air battery, a lithium anode provides a lithium ion and an electron, and the lithium ion is transferred to the cathode surface through a solid electrolyte, while the electron is transferred from the lithium anode to the cathode surface through an external circuit. Here, the air including oxygen and moisture, which is present on the cathode surface, reacts with the lithium ion and the electron to generate LiOH as a reaction product. Since LiOH is an alkali hydroxide, which is strongly basic, a cathode material that is stable when contacted by LiOH, and does not deteriorate in the presence of a strong base is desired. A porous carbon or a ruthenium (Ru) based metals have been used as cathode materials having electronic and ionic conductivity in lithium-air batteries. However, such materials can deteriorate under a strongly basic condition. As such, the use of the moisture-containing air as a cathode active material has been limited.

The present inventors have identified that a compound having a particular composition, which will later be described, is electrochemically stable under a basic condition, for example, under a strongly basic condition, and is unexpectedly structurally and chemically stable at a voltage in a range of 2 V to 4.5 V vs $Li/Li^+$, which corresponds to a charge/discharge voltage range of a lithium-air battery. The identified compound can be used to prepare a cathode for a lithium air battery.

The base-resistant compound included in the cathode is structurally and chemically stable at a pH of about 7 or greater, for example, about 8 or greater, about 9 or greater, about 10 or greater, about 11 or greater, or about 12 or greater. For example, the base-resistant compound may be electrochemically stable at a pH of about 9 or greater. The base-resistant compound may be electrochemically stable at a pH from about 7 to about 14, about 8 to about 13, or about 9 to about 12.

According to an embodiment, the base-resistant compound may be electrochemically stable at a pH of about 12 to about 14. The pH value from about 12 to about 14, which is a pH value of an aqueous solution having LiOH dissolved therein, may be a pH value produced by a discharge product generated from a lithium-air battery using the air including moisture as a cathode active material.

According to an embodiment, the base-resistant compound is thermodynamically stable at 2 V to 4.5V vs $Li/Li^+$, e.g., may have a 0 or positive Gibbs free energy difference ($\Delta G$) of about 3 eV to about 0.1 eV, or equal to or greater than 0 eV at a voltage of 2 V to 4.5 V vs $Li/Li^+$. Therefore, the base-resistant compound is electrochemically stable during charge and discharge of the lithium-air battery, and thus does not undergo a phase change.

According to an embodiment, the base-resistant compound may be electrochemically stable with respect to lithium metal, or a lithium-containing alloy at a voltage of 2 V to 4.5 V vs $Li/Li^+$ and a pH of about 9 to about 14. For example, the base-resistant compound may be electrochemically stable with respect to a lithium metal at a voltage of 2 V to 4.5 V vs $Li/Li^+$ and a pH of 12 to 14. Therefore, since the base resistant compound may be structurally and chemically stable under a basic or strongly basic pH environment and at a particular charge/discharge voltage, the lithium-air battery including the base-resistant compound may have improved durability, and thus may have desirable long life characteristics. In addition, the lithium-air battery may provide improved rate capability when moisture is used as a cathode active material relative to when moisture is not used.

According to an embodiment, the base-resistant compound may have suitable oxidation resistance and reduction resistance with respect to lithium metal at a voltage of 2 V to 4.5 V vs Li/Li$^+$ and a pH of about 12 to about 14. The term "oxidation resistance" used herein means resistance to oxidation by not participating in an oxidation reaction. Similarly, the term "reduction resistance" means resistance to reduction by not participating in a reduction reaction. Therefore, the base-resistant compound may be substantially non-reactive, e.g., inert, under the aforementioned pH environment and charge/discharge voltage. In an aspect, the base-resistant compound is not involved in oxidation and reduction of lithium and oxygen under the pH environment in the foregoing charge/discharge voltage range.

According to an embodiment, the base-resistant compound may include at least one of a binary compound or a ternary compound. For example, the binary compound and the ternary compound may include an oxide of a metal, a fluoride of a metal, an oxyfluoride or fluoro-oxide of a metal, or an alloy of two or more metals.

According to an embodiment, the base-resistant compound may include at least one of K, Be, Mg, Ca, Sr, Ba, Sc, Y, Ti, Zr, Hf, Nb, Ta, Mo, W, Fe, Zn, Cd, B, Al, Ga, In, C, Si, Ge, Sn, P, As, Sb, Bi, O, S, Te, F, La, Ce, Pr, Nd, Sm, Eu, Gd, Tb, Dy, Ho, Er, Tm, Yb, Lu, Th, U, or Pu. For example, the base-resistant compound may include a binary compound or a ternary compound including two or three of the foregoing elements. At least one of the elements included in the binary compound and the ternary compound may be at least one of O or F.

According to an embodiment, the base-resistant compound may be represented by Chemical Formula 1:

$$M1_\alpha X1_\beta \qquad \text{Chemical Formula 1}$$

wherein in Chemical Formula 1,

M1 is at least one of K, Be, Mg, Ca, Sr, Ba, Sc, Y, Ti, Zr, Hf, Nb, Ta, Mo, W, Fe, Zn, Cd, B, Al, Ga, In, C, Si, Ge, Sn, P, As, Sb, Bi, S, Te, La, Ce, Pr, Nd, Sm, Eu, Gd, Tb, Dy, Ho, Er, Tm, Yb, Lu, Th, U, or Pu; X1 is at least one of O or F; and $0 \leq \alpha \leq 32$, and $0 \leq \beta \leq 68$.

According to an embodiment, the base-resistant compound may be represented by at least one of Chemical Formula 2 or Chemical Formula 3:

$$M2_{a1} X2_{b1} \qquad \text{Chemical Formula 2}$$

$$M3_{a2} M4_{a3} X3_{b2} \qquad \text{Chemical Formula 3}$$

wherein in Chemical Formula 2,

M2 is at least one of Be, Sc, Y, Ti, Zr, Hf, Ta, In, Sn, Ce, Nd, Sm, Eu, Gd, Tb, Dy, Ho, Er, Tm, Yb, Lu, Th, U, or Pu; X2 is at least one of O or F; and $0 \leq a1 \leq 2$, and $0 \leq b \leq 5$, and wherein Chemical Formula 3, each of M3 and M4 are independently at least one of K, Mg, Ca, Sr, Ba, Sc, Y, Ti, Zr, Hf, Nb, Ta, Mo, W, Fe, Zn, Cd, B, Al, Ga, In, C, Si, Ge, Sn, P, As, Sb, Bi, S, Te, La, Ce, Pr, Nd, Sm, Eu, Gd, Tb, Dy, Ho, Er, Tm, Yb, Lu, Th, or U;

X3 is at least one of O or F; and $0 \leq a2 \leq 29$, $0 \leq a3 < 29$, and $0 \leq b2 \leq 68$.

According to an embodiment, the base-resistant compound may be represented by Chemical Formula 4:

$$M3'_{a2'} M4'_{a3'} X3'_{b2'} \qquad \text{Chemical Formula 4}$$

wherein in Chemical Formula 4,

M3' is at least one of K, Mg, Ca, Sr, Ba, Sc, Y, Ti, Zr, Ta, Zn, Cd, Al, La, Ce, Pr, Nd, Sm, Eu, Gd, Tb, Dy, Ho, Er, Tm, Yb, Lu, Th, or U, M4' is at least one of Sc, Y, Ti, Zr, Hf, Nb, Ta, Mo, W, Fe, Zn, Cd, B, Al, Ga, In, C, Si, Ge, Sn, P, As, Sb, Bi, S, Te, Ho, Tm, Th, or U, X3' is at least one of O or F, and $0 \leq a2' \leq 29$, $0 < a3' \leq 25$, and $0 \leq b2' \leq 68$.

According to an embodiment, when a3' is 0 in Chemical Formula 4, X3' may include O and F.

According to an embodiment, the base-resistant compound may include at least one of $Y_2O_3$, $HfO_2$, $Ta_2O_5$, $CeO_2$, $ZrO_2$, $Nd_2O_3$, $PuO_2$, $Tb_2O_3$, $Dy_2O_3$, $Gd_2O_3$, $Sm_2O_3$, $Ho_2O_3$, $TiO_2$, $Er_2O_3$, $Sc_2O_3$, $Tm_2O_3$, $Lu_2O_3$, $ThO_2$, $UO_3$, $Eu_2O_3$, $In2O3$, $BeO$, $SnO_2$, $YbF_2$, $Al_2ZnO_4$, $BaTa_2O_6$, $BaUO_4$, $CaTa_2O_6$, $CaUO_4$, $Cd(GaO_2)_2$, $Cd_2Sb_2O_7$, $CdIn_2O_4$, $CdSnO_3$, $CeTh_9O_2O$, $Dy_{11}Y_5O_{24}$, $Dy_{29}Y_3O_{48}$, $Dy_2CO_5$, $Dy_2GeO_5$, $Dy_2Hf_2O_7$, $Dy_2SiO_5$, $Dy_2Sn_2O_7$, $Dy_2Ti_2O_7$, $Dy_2WO_6$, $Dy_2Zr_8O_{19}$, $Dy_3Al_5O_{12}$, $Dy_3Ga_5O_{12}$, $Dy_3GaOs$, $Dy_3Y_5O_{12}$, $DyAsO_4$, $DyNbO_4$, $DyOF$, $DyPO_4$, $DyTaO_4$, $DyY_3O_6$, $DyY_7O_{12}$, $Er_{10}W_2O_{21}$, $Er_2GeO_5$, $Er_2SiO_5$, $Er_2Sn_2O_7$, $Er_2TiO_5$, $Er_3Al_5O_{12}$, $Er_3Ga_5O_{12}$, $Er_4Zr_3O_{12}$, $ErAsO_4$, $ErBO_3$, $ErNbO_4$, $ErPO_4$, $ErTaO_4$, $Eu_2Hf_2O_7$, $Eu_2SiO_5$, $Eu_2Sn_2O_7$, $Eu_3Ga_5O_{12}$, $Eu_3GaOs$, $Eu_3NbO_7$, $EuWO_{12}$, $EuOF$, $Gd_2GeO_5$, $Gd_2Hf_2O_7$, $Gd_2MoO_6$, $Gd_2SiO_5$, $Gd_2Sn_2O_7$, $Gd_2TiO_5$, $Gd_3Al_5O_{12}$, $Gd_3Ga_5O_{12}$, $Gd_3GaO_6$, $Gd_3SbO_7$, $Gd_3Y_{13}O_{24}$, $Gd_3Y_5O_{12}$, $Gd_5Y_3O_{12}$, $Gd_6WO_{12}$, $GdAsO_4$, $GdInO_3$, $GdNbO_4$, $GdOF$, $GdPO_4$, $GdTaO_4$, $Ho_2SiO_5$, $Ho_2Sn_2O_7$, $Ho_2Ti_2O_7$, $Ho_2WO_6$, $Ho_2Zr_8O_{19}$, $Ho_3Al_5O_{12}$, $Ho_3Ga_5O_{12}$, $Ho_3GaO_6$, $Ho_3ScO_6$, $HoAsO_4$, $HoBO_3$, $HoNbO_4$, $HoOF$, $HoPO_4$, $HoTaO_4$, $KTa_5O_{13}$, $La_2CO_5$, $La_2GeO_5$, $La_2Hf_2O_7$, $La_2MoO_6$, $La_2Si_2O_7$, $La_2Sn_2O_7$, $La_2SO_6$, $La_2TeO_6$, $La_2Th_8O_{19}$, $La_2Ti_2O_7$, $La_2UO_6$, $La_2WO_6$, $La_2Zr_2O_7$, $La_3Ga_5O_{12}$, $La_4Ga_2O_9$, $LaAlO_3$, $LaAsO_4$, $LaBO_3$, $LaNbO_4$, $LaOF$, $LaPO_4$, $LaSbO_4$, $LaScO_3$, $LaTaO_4$, $Lu_2SiO_5$, $Lu_2Sn_2O_7$, $Lu_2TiO_5$, $Lu_4Hf_3O_{12}$, $Lu_4Zr_3O_{12}$, $Lu_6UO_{12}$, $LuWO_{12}$, $LuGaO_3$, $LuNbO_4$, $LuSbO_4$, $LuTaO_4$, $Mg(GaO_2)_2$, $MgTa_2O_6$, $MgTi_2O_5$, $Nd_2GeO_5$, $Nd_2Hf_2O_7$, $Nd_2MoO_6$, $Nd_2SiO_5$, $Nd_2Sn_2O_7$, $Nd_2TeO_6$, $Nd_2Ti_2O_7$, $Nd_2WO_6$, $Nd_2Zr_8O_{19}$, $Nd_3Ga_5O_{12}$, $Nd_3GaO_6$, $Nd_3U_2O_{10}$, $Nd_4Ga_2O_9$, $NdAlO_3$, $NdAsO_4$, $NdBO_3$, $NdFeO_3$, $NdNbO_4$, $NdOF$, $NdPO_4$, $NdSbO_4$, $NdScO_3$, $NdTaO_4$, $PrTaO_4$, $Sc_2Ti_2O_7$, $ScTaO_4$, $Sm_{27}Y_5O_{48}$, $Sm_2Ge_2O_7$, $Sm_2Hf_2O_7$, $Sm_2MoO_6$, $Sm_2SiO_5$, $Sm_2Sn_2O_7$, $Sm_2TeO_6$, $Sm_2Th_8O_{19}$, $Sm_2TiO_5$, $Sm_2WO_6$, $Sm_2Zr_8O_{19}$, $Sm_3Ga_5O_{12}$, $Sm_3GaO_6$, $SmAlO_3$, $SmAsO_4$, $SmBO_3$, $SmNbO_4$, $SmOF$, $SmPO_4$, $SmSbO_4$, $SmScO_3$, $SmTaO_4$, $SmY_{15}O_{24}$, $Sr_2U_{11}O_{36}$, $SrTa_2O_6$, $Ta_{12}MoO_{33}$, $Ta_2Cd_2O_7$, $Ta_2Zn_3O_8$, $Ta_2ZnO_6$, $TaAlO_4$, $TaBiO_4$, $TaInO_4$, $Tb_2Ge_2O_7$, $Tb_2SiO_5$, $Tb_2Sn_2O_7$, $Tb_2Ti_2O_7$, $Tb_2WO_6$, $Tb_2Zr_8O_{19}$, $Tb_3Al_5O_{12}$, $Tb_3Ga_5O_{12}$, $Tb_3GaO_6$, $TbAsO_4$, $TbNbO_4$, $TbOF$, $TbPO_4$, $TbTaO_4$, $ThTa_2O_7$, $ThTi_2O_6$, $Ti_3Zn_2O_8$, $TiCdO_3$, $Tm_2Si_2O_7$, $Tm_2Sn_2O_7$, $Tm_2Ti_2O_7$, $Tm_2Zr_8O_{19}$, $Tm_3Al_5O_{12}$, $Tm_3Ga_5O_{12}$, $Tm_6WO_{12}$, $TmNbO_4$, $TmOF$, $TmPO_4$, $TmTaO_4$, $UCdO_4$, $Y_{11}Tm_5O_{24}$, $Y_{13}Ho_{19}O_{48}$, $Y_{13}Ho_3O_{24}$, $Y_{13}Tm_3O_{24}$, $Y_{15}TmO_{24}$, $Y_2GeO_5$, $Y_2Hf_2O_7$, $Y_2HfO_5$, $Y_2SiO_5$, $Y_2Sn_2O_7$, $Y_2Th_8O_{19}$, $Y_2TiO_5$, $Y_2Zr_8O_{19}$, $Y_3Al_5O_{12}$, $Y_3Ga_5O_{12}$, $Y_3GaO_6$, $Y_3SbO_7$, $Y_5Tm_{11}O_{24}$, $Y_6WO_{12}$, $Y_7HoO_{12}$, $Y_7TmO_{12}$, $YAsO_4$, $Yb_4Ta_{25}O_{68}$, $YbCO_3$, $YBO_3$, $YbTiO_3$, $YNbO_4$, $YOF$, $YPO_4$, $YTaO_4$, $Zn(GaO_2)_2$, or $Zr_8Sc_2O_{19}$.

These base-resistant compounds are electrochemically stable with respect to a lithium anode at a voltage of 2 V to 4.5 V vs Li/Li$^+$ at a pH of about 12 to about 14, and thus enable the lithium-air battery using the air including moisture as a cathode active material to be used for an extended period of time.

According to an embodiment, the base-resistant compound may be included in the cathode in an amount of about 1 part by weight to 100 parts by weight, based on 100 parts by weight of the cathode. For example, the amount of the base-resistant compound included in the cathode may be about 10 parts by weight to 100 parts by weight, about 50 parts by weight to 100 parts by weight, about 60 parts by weight to 100 parts by weight, about 70 parts by weight to 100 parts by weight, about 80 parts by weight to 100 parts by weight or about 90 parts by weight to 100 parts by weight. When the amount of the base-resistant compound included in the cathode is within these ranges, a cathode having a sufficiently high durability with respect to the discharge product can be attained.

The cathode may include a conductive material, a catalyst for oxidation/reduction of oxygen, or a binder.

The air may include about 1 volume percent (vol %) to 100 vol % of moisture, based on a total volume of the air. For example, a volume proportion of moisture in the air may be about 5 vol % to about 99 vol %, about 10 vol % to about 98 vol %, about 20 vol % to about 97 vol %, about 30 vol % to about 96 vol %, about 40 vol % to about 95 vol %, about 50 vol % to about 94 vol %, about 55 vol % to about 93 vol %, about 60 vol % to about 92 vol %, about 65 vol % to 91 vol %, or about 70 vol % to 90 vol %. As about 5% or more, for example about 10% or more, by volume of the moisture is included in the air, the moisture is used as a cathode active material, thereby generating a sufficiently high power output.

A lithium-air battery according to an embodiment includes the cathode; an anode including lithium; and an electrolyte disposed between the cathode and the anode.

Deterioration of the lithium-air battery is inhibited by the use of the cathode including the base-resistant compound, and high output power can be achieved.

The lithium-air battery includes a cathode. The cathode is an air electrode, and the air included in the air electrode is air including moisture and oxygen. The cathode may be arranged on, for example, a cathode current collector.

The cathode is inert with respect to a discharge product having a pH of 9 or greater. For example, the cathode is inert with respect to a discharge product at a pH of 12 to 14. Therefore, in the lithium-air battery using the air including moisture as a cathode active material, the cathode is structurally stable and deterioration thereof is inhibited, and thus the lithium-air battery can have a long life characteristic.

The discharge product may include LiOH generated by a reaction between a lithium ion and gaseous moisture (H$_2$O (g)). The discharge product can be expressed by the above chemical formula. An alkali hydroxide such as LiOH is strongly basic and has a pH of 12 to 14 in an aqueous state.

In an embodiment, the cathode comprises a porous layer including, for example, the base-resistant compound. The amount of the base-resistant compound included in the cathode may be, for example, 1 part by weight to 100 parts by weight, 10 parts by weight to 100 parts by weight, 50 parts by weight to 100 parts by weight, 60 parts by weight to 100 parts by weight, 70 parts by weight to 100 parts by weight, 80 parts by weight to 100 parts by weight or 90 parts by weight to 100 parts by weight, based on 100 parts by weight of the cathode. The cathode may substantially include, for example, a porous layer. The porous layer may substantially include, for example, a base-resistant compound. For example, the porous layer may substantially consist of a base-resistant compound. The cathode has a simplified configuration and can be easily manufactured by substantially including the porous layer including the base-resistant compound. The cathode is permeable with respect to, for example, a gas such as moisture, oxygen or air. Therefore, the cathode is distinguished from a cathode that is substantially impermeable to a gas such as moisture or oxygen. The moisture, oxygen or air may be easily diffused into the cathode by the cathode being porous and/or gas permeable, and thus electrochemical reactions between lithium ions, electrons, oxygen and moisture can be easily carried out on a surface of the cathode.

Alternatively, the cathode may include a porous layer, the porous layer may include a conductive material, which will later be described, and may further include a coating layer on its surface, and the coating layer may include a base-resistant compound. Alternatively, the coating layer may be made of a base-resistant compound.

Therefore, the cathode may be distinguished from an available cathode that is substantially impermeable to a gas such as moisture or oxygen. In addition, the moisture, oxygen or air may be easily diffused into the cathode by the cathode being porous and/or gas permeable and lithium ions and/or electrons may easily migrate through a porous layer, and thus electrochemical reactions between lithium ions, electrons, oxygen and moisture can be easily carried out on the surface of the cathode.

Moreover, deterioration of the cathode, caused by a discharge product, may be prevented by the coating layer including the base-resistant compound, and thus the cathode has a long life characteristic.

The conductive material may be a porous and/or conductive material, and any suitable material having suitable porosity and suitable conductivity may be used. For example, the conductive material may be a porous carbon-based material. Examples of the carbon-based material include a carbon black-like material, a graphite-like material, a graphene-like material, an activated carbon-like material, and a carbon fiber-like material, but are not limited thereto. Any suitable carbon-based material may be used.

The conductive material may be, for example, a metallic material. The metallic material may be, for example, a metal fiber, a metal mesh, or a metal powder. The metal powder may be, for example, copper, silver, nickel, or aluminum. The conductive material may be, for example, an organic conductive material. The conductive material may be, for example, a polyphenylene derivative, or a polythiophene derivative. The conductive material may be used alone or in combination. The cathode may include a composite conductor as a conductive material, and may further include the above-mentioned conductive materials in addition to the composite conductor.

The cathode may further include a catalyst for facilitating oxidation/reduction of oxygen. Examples of the catalyst include: a precious metal-based catalyst, such as platinum (Pt), gold (Au), silver (Ag), palladium (Pd), ruthenium (Ru), rhodium (Rh), and osmium (Os); an oxide-based catalyst, such as manganese oxide, iron oxide, cobalt oxide, and nickel oxide; or an organic metal-based catalyst, such as cobalt phthalocyanine, but are not limited thereto. Any suitable catalyst for oxidation/reduction of oxygen may be used.

The catalyst may be provided on a support. The support may be, for example, an oxide support, a zeolite support, a clay mineral support, or a carbon support. The oxide support may be, for example, a metal or semimetal oxide support including at least one of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide support may include, for example, alumina, silica, zirconium oxide, and titanium dioxide. The carbon support may include, but is not limited to, a carbon black-like material, such as Ketjen black, acetylene black, channel black, or lamp black; a graphite-like material, such as natural graphite, artificial graphite, or expanded graphite; an activated carbon-like material; or a carbon fiber-like material. Any suitable support may be used.

The cathode may further include, for example, a binder. The binder may include, for example, a thermoplastic resin or a thermosetting resin. Examples of the binder may include at least one of, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer. The binder may be used alone or in combination. Any material suitable binder may be used.

The cathode is prepared by mixing, for example, a conductive material, a catalyst for oxidation/reduction of oxygen, and a binder, and then adding an appropriate solvent thereto to prepare a cathode slurry, and coating the cathode slurry on a surface of a substrate and then drying or press-molding the cathode slurry on a substrate for increasing an electrode density. The substrate may be, for example, a cathode current collector, a separator, or a solid electrolyte layer. The cathode current collector may be, for example, a gas diffusion layer. The conductive material may include a composite conductor, and the catalyst for oxidation/reduction of oxygen and the binder may not be provided in the cathode according to the kind of cathode required.

The lithium-air battery includes an anode. The anode includes lithium.

The anode may be, for example, a lithium metal film or a lithium-based alloy film.

The lithium-based alloy may be, for example, an alloy of lithium with aluminum, tin, magnesium, indium, potassium, titanium, or vanadium.

The lithium-air battery includes an electrolyte layer disposed between the cathode and the anode.

The electrolyte layer includes at least one of a solid electrolyte, a gel electrolyte, or a liquid electrolyte. The solid electrolyte, the gel electrolyte, and the liquid electrolyte are not particularly limited, and any suitable electrolyte may be used.

The solid electrolyte may include, but is not limited to, at least one of an ionically conducting inorganic material, a solid electrolyte including a polymeric ionic liquid (PIL) and a lithium salt, a solid electrolyte including an ionically conducting polymer and a lithium salt, and a solid electrolyte including an electronically conducting polymer, or any suitable solid electrolyte.

The ionically conducting inorganic material may include, but is not limited to, at least one of a glass or amorphous metal ion conductor, a ceramic active metal ion conductor, and a glass ceramic active metal ion conductor, or any suitable ionically conducting inorganic material. The ionically conducting inorganic material may be in the form of, for example, ionically conducting inorganic particles or a sheet formed of the ionically conducting inorganic material.

Examples of the ionically conducting inorganic material may include at least one of $BaTiO_3$, $Pb(Zr_aTi_{1-a})O_3$ (PZT) wherein $0 \leq a \leq 1$, $Pb_{1-x}La_xZr_{1-y}TiyO_3$(PLZT) (wherein $0 < x < 1$ and $0 \leq y < 1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate (e.g., $Li_3PO_4$), lithium titanium phosphate (e.g., $Li_xTi_y(PO_4)_3$, wherein $0<x<2$ and $0 \leq y<3$), lithium aluminum titanium phosphate (e.g., $Li_xAl_yTi_z(PO_4)_3$, $0<x<2$, $0<y<1$, and $0<z<3$), $Li_{1+x+y}(Al_aGa_{1-a})_x(Ti_bGe_{1-b})_{2-x}Si_yP_{3-y}O_{12}$ wherein $0 \leq x \leq 1$, $0 \leq y \leq 1$, $0 \leq a \leq$, and $0 \leq b \leq 1$), lithium lanthanum titanate (e.g., $Li_xLa_yTiO_3$, wherein $0<x<2$ and $0<y<3$), lithium germanium thiophosphate ($Li_xGe_yP_zS_w$, $0<x<4$, $0<y<1$, $0<z<1$, and $0<w<5$), lithium nitride (e.g., $Li_xN_y$, wherein $0<x<4$ and $0<y<2$), $SiS_2$-based glass (e.g., $Li_xSi_yS_z$, wherein $0<x<3, 0<y<2$, and $0<z<4$), $P_2S_5$-based glass (e.g., $Li_xP_yS_z$, wherein $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$-based ceramics, or a Garnet-based ceramic (e.g., $Li_{3+x}La_3M2O_{12}$, wherein $0<x<8$, and M is at least one of tellurium (Te), niobium (Nb), or zirconium (Zr)).

Examples of the polymeric ionic liquid (PIL) may include repeating units including: i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation; and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^{2-}$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF^-$, $SbF^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$. Examples of the polymeric ionic liquid may include poly (diallyldimethylammonium bistrifluoromethanesulfonylimide) (poly(diallyldimethylammonium)TFSI), poly(1-allyl-3-methylimidazolium trifluoromethanesulfonylimide), or poly (N-methyl-N-propylpiperidinium bis (trifluoromethanesulfonyl)imide).

The ionically conducting polymer may include at least one of ion conductive repeating unit of an ether-based monomer, an acryl-based monomer, a methacryl-based monomer, or a siloxane-based monomer.

Examples of the ionically conducting polymer may include, but are not limited to, polyethylene oxide (PEO), polyvinyl alcohol (PVA), polyvinylpyrrolidone (PVP), polyvinylsulfone (polysulfone), polypropylene oxide (PPO), polymethylmethacrylate, polyethylmethacrylate, polydimethyl siloxane, polyacrylic acid, polymethacrylic acid, polymethylacrylate, polyethylacrylate, poly-2-ethylhexyl acrylate, polybutyl methacrylate, poly2-ethylhexylmethacrylate, polydecylacrylate, polyethylenevinylacetate, a phosphate ester polymer, polyester sulfide, and polyfluorovinylidene (PVdF), Li-substituted Nafion, or any suitable ionically conducting polymer.

Examples of the electronically conducting polymer may include, but are not limited to, a polyphenylene derivative and polythiophene derivative, or any suitable electronically conducting polymer.

The gel electrolyte may be obtained by additionally adding a low-molecular weight solvent to, for example, a solid electrolyte disposed between the cathode and the anode.

The gel electrolyte is obtained by additionally adding a solvent, that is, a low-molecular weight organic compound, an oligomer, or the like, to, for example, a polymer.

The liquid electrolyte includes a solvent and a lithium salt.

The solvent includes, but is not limited to, at least one of an organic solvent, an ionic liquid, and an oligomer, or any suitable solvent that is a liquid at room temperature (25° C.).

The organic solvent may include, for example, at least one of an ether-based solvent, a carbonate-based solvent, an ester-based solvent, or a ketone-based solvent.

Examples of the organic solvent may include at least one of propylene carbonate, ethylene carbonate, fluoroethylene carbonate, vinyl ethylene carbonate butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethylacetamide, dimethylsulfoxide, dioxane, 1,2-dimethoxyethane, sulforane, dichloroethane, chlorobenzene, nitrobenzene, succinonitrile, diethylene glycol dimethylether (DEGDME), tetraethylene glycol dimethylether (TEGDME), polyethylene glycol dimethylether (PEGDME, Mn=~500), dimethylether, diethylether, dibutylether, dimethoxyethane, 2-methyltetrahydrofuran, or tetrahydrofuran, but is not limited thereto, and any suitable organic solvent may be used so long as it exists in a liquid phase at room temperature.

Examples of the ionic liquid (IL) may include: i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation; and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N-$, Cl—, Br—, I—, $BF_4^-$, $SO_4^{2-}$, $PF_6^-$, $ClO_4^-$, $CF_3SO_3^-$, $CF_3CO_2^-$, $(C_2F_5SO_2)_2N-$, $(C_2F_5SO_2)(CF_3SO_2)N-$, $NO_3^-$, $Al_2Cl_7^-$, $AsF_6^-$, $SbFe^-$, $CF_3COO^-$, $CH_3COO^-$, $CF_3SO_3^-$, $(CF_3SO_2)_3C^-$, $(CF_3CF_2SO_2)_2N-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N-$.

The lithium salt may include, but is not limited to, at least one of lithium bis(trifluoromethanesulfonyl)imide (LiTFSI), $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, lithium trifluoromethane sulfonate (LiTfO), or any suitable lithium salt. A concentration of the lithium salt may be, for example, about 0.01 M to about 5.0 M.

The lithium-air battery may further include, for example, a separator disposed between the cathode and the anode. The separator is not limited as long as it has a suitable composition for an operating condition of a lithium air battery. The separator may include, for example, a non-woven polymer fabric such as a non-woven fabric including a polypropylene material or a non-woven fabric including a polyphenylene sulfide material, a porous film including an olefin-based resin such as polyethylene or polypropylene, glass fiber, or a combination of two or more of these materials.

The electrolyte layer may have, for example, a solid polymer electrolyte impregnated in the separator or a liquid electrolyte impregnated in the separator. The electrolyte in which a solid polymer electrolyte is impregnated in the separator may be prepared by arranging solid polymer electrolyte films on opposite surfaces of the separator, and roll-pressing the resulting structure at the same time. The electrolyte in which a liquid electrolyte is impregnated in the separator is prepared by injecting a liquid electrolyte including a lithium salt into the separator.

The lithium-air battery may be prepared by installing the anode on an inner side of a case, sequentially arranging the electrolyte layer on the anode, the cathode on the electrolyte layer, and a porous cathode current collector on the cathode, and then arranging a pressing member on the porous cathode current collector to press a resulting cell structure to allow the air including moisture and oxygen to be transferred to an air electrode. The case may be divided into upper and lower portions that contact the anode and the air electrode, respectively, and an insulating resin may be disposed between the upper and lower portions of the case to electrically insulate the cathode and the anode from one another.

The lithium-air battery may be used as a lithium primary battery or a lithium secondary battery. The lithium-air battery may have any suitable shape of, for example, a coin, a button, a sheet, a stack, a cylinder, a plane, or a horn, but not limited thereto. The lithium-air battery may be used in a medium or large battery for electric vehicles.

Figure 8:
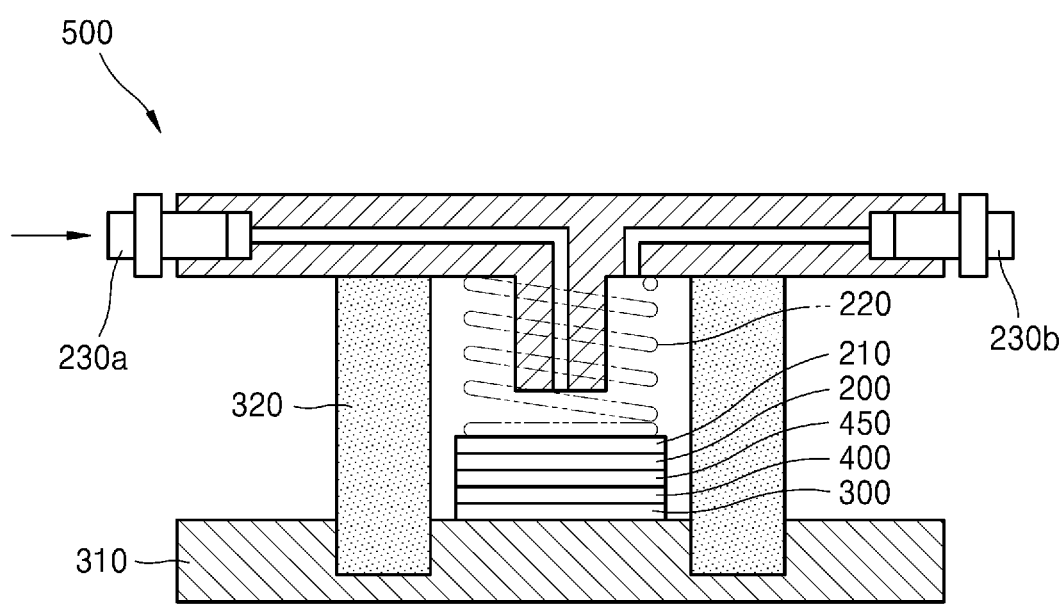
FIG. 8 is a schematic view illustrating an embodiment of a structure of a lithium-air battery.

A schematic structure of a lithium-air battery 500 according to an embodiment is shown in FIG. 8. The lithium-air battery 500 includes a cathode 200 adjacent to a first current collector 210 that uses the air including moisture and oxygen as an active material, an anode 300 adjacent to a second current collector 310 and including lithium, and a first electrolyte 400 disposed between the cathode 200 and the anode 300. The first electrolyte layer 400 is a separator having a liquid electrolyte impregnated therein.

A second electrolyte layer 450 is disposed between the cathode 200 and the first electrolyte layer 400. The second electrolyte layer 450 is a lithium ion conductive solid electrolyte layer. The first current collector 210 may be porous and may function as a gas diffusion layer which allows diffusion of the air including moisture and oxygen.

Alternatively, a gas diffusion layer may be additionally disposed between the first current collector 210 and the cathode 200. A pressing member 220 for transferring the air including moisture and oxygen to the cathode 200 may be arranged on the first current collector 210. A case 320 made of an insulating resin may be disposed between the cathode 200 and the anode 300 to electrically insulate the cathode 200 and the anode 300 from one another. The air is supplied to the lithium-air battery 500 through an air inlet 230a and may be discharged through an air outlet 230b. The lithium-air battery 500 may be provided in a stainless steel container. The air, which is present in a cavity between the first current collector and the cathode, includes moisture and oxygen, and a volume proportion of moisture in the air may be 1 vol % and less than 100 vol %, for example, 5 vol % to 100 vol %, 10 vol % to 100 vol %, 30 vol % to 100 vol %, 40 vol % to 100 vol %, 50 vol % to 100 vol %, 60 vol % to 100 vol %, 70 vol % to 100 vol %, 80 vol % to 100 vol %, or 90 vol % to 100 vol %, based on a total volume of the air.

The term "air" used with regard to a lithium-air battery is not limited to atmospheric air, and may refer to a combination of gases including oxygen. This broad definition of "air" may also be applied in other ways, such as an air battery or an air electrode.

A method of preparing a cathode according to an embodiment includes the steps of: preparing a composition including a base-resistant compound and a binder; molding the composition to prepare a sheet; and heat-treating the sheet under an oxidation atmosphere at a temperature of about 900° C. to about 1300° C.

The composition may include, for example, the base-resistant compound, a binder, a dispersant, or a plasticizer. The type and amount of a binder, a dispersant, and a plasticizer used are not particularly limited, and any suitable binder, dispersant, and plasticizer for forming a green sheet including ceramic may be used. The composition may include, for example, about 5 parts by weight to about 20 parts by weight of a binder, about 1 part by weight to about 10 parts by weight of a dispersant, and about 1 part by weight to about 10 parts by weight of a plasticizer, based on 100 parts by weight of the base-resistant compound. The composition may further include a solvent. An amount of the solvent may be about 1 part by weight to about 500 parts by weight, for example, based on 100 parts by weight of a total solid content of the base-resistant compound, the binder, the dispersant, or the plasticizer.

The step of preparing the sheet may include, for example, coating the composition on a substrate to prepare a coating layer and drying the composition on the substrate to prepare a dried coating layer; and stacking and laminating a plurality of dried layers to prepare the sheet.

The composition may be coated on a substrate such as a release film to a thickness of about 1 to about 1000 μm using a doctor blade and then dried to prepare a dried coating layer. A plurality of dried coating layers disposed on the release film are prepared, and stacked so as to face each other, and then laminated to prepare a green sheet. The laminating may be performed by hot rolling with a predetermined pressure.

The prepared green sheet may be heat-treated under an oxidation atmosphere of 500° C. to 700° C. for 1 hour to 4 hours, and then additionally heat-treated under an oxidation atmosphere at a temperature of about 900° C. to about 1300° C. for about 3 to about 10 hours.

As a result of the heat-treatment performed under the oxidation atmosphere at a temperature of about 500° C. to about 700° C. for about 1 hour to about 4 hours, organic materials in the green sheet may be stably decomposed for removal, and as a result of the heat-treatment performed under the oxidation atmosphere at a temperature of about 900° C. to about 1300° C. for about 3 to about 10 hours, base-resistant compound powder is sintered and thus a stable and strong porous layer is prepared. During the heat-treatment, a temperature increase rate may be, for example, 5° C. per minute, up to a heat-treatment temperature, and cooling may be performed by natural cooling.

The inventive concept will be described in further detail with reference to the following examples and comparative examples. However, the examples are provided for illustrating the inventive concept, but the scope of the inventive concept is not limited thereto.

Preparation of Cathode

EXAMPLES

Example 1: Cathode including $Y_2O_3$ $Y_2O_3$(Sigma Aldrich) was ground in a ball mill to obtain powder having an average diameter of 100 nanometers (nm). $Y_2O_3$ powder and polyacrylic acid (molecular weight: 1,800 Dalton) as a dispersant were added to ethanol and stirred to prepare a suspension. The amount of $Y_2O_3$ was 0.1% by weight and the amount of dispersant was 0.05% by weight.

Carbon paper (SGL, 29BA) was used as each an anode and a cathode in the suspension. The carbon paper used had a thickness of about 190 μm, a porosity of about 89%, and an area resistance (through-plane resistance) of less than 10 $m\Omega \cdot cm^{-2}$ Fibrous carbon included in the carbon paper had an average diameter of about 7 μm. A voltage of 100 V/cm was applied between the cathode and the anode for 10 minutes to deposit $Y_2O_3$ on the carbon paper through electrophoretic deposition.

A loading level of the deposited metal oxide coating layer was 2 $mg/cm^2$. The carbon paper having a metal oxide deposited thereon was taken out from the suspension and dried at 25° C. for 2 hours to prepare a cathode. The cathode had a porosity of about 89%.

Examples 2 and 3

Cathodes were prepared in the same manner as in Example 1, except that $HfO_2$ (Sigma Aldrich) and $Ta_2O_5$ (Sigma Aldrich), instead of $Y_2O_3$, were used, respectively.

Comparative Example 1: $Li_{0.34}La_{0.55}RuO_3$ $Li_2CO_3$, $La_2O_3$, and $RuO_2$, each in the form of powder, were added to ethanol according to the composition ratio of $Li_{0.34}La_{0.55}RuO_3$ and mixed. An amount of ethanol is about 4 parts by weight, based on 100 parts by weight of a total weight of the $Li_2CO_3$, $La_2O_3$, and $RuO_2$.

The mixture was put into a ball-milling device to be milled and mixed for 4 hours. The mixed product was dried and heated up to 800° C. at a temperature increase rate of about 5° C./min, and then subjected to primary heat-treatment at 800° C. under an air atmosphere for 4 hours.

The powder obtained by the primary heat-treatment was ground to prepare powder having a primary particle size of about 0.3 μm. The prepared powder was pressed to prepare cylindrical pellets each having a diameter of about 1.3 cm, a height of about 0.5 cm, and a weight of about 0.3 g. The prepared pellets were subjected to secondary heat-treatment at a temperature of 1200° C. under an air atmosphere for about 24 hours to obtain a desired product. When increasing the temperature up to 1200° C. for secondary heat-treatment, a temperature increase rate was about 5° C./min.

A cathode was prepared in the same manner as in Example 1 using the prepared $Li_{0.34}La_{0.55}RuO_3$.

Evaluation Example 1: Evaluation of Strong Base Stability

The cathodes prepared in Examples 1 to 3 and Comparative Example were used as working electrodes and a Pt electrode was used as a counter electrode in 1 M LiOH aqueous solution, a voltage of 2.8 V was applied for 18 hours, and metals, other than Li ions, dissolved in the aqueous solution were analyzed. The results are shown in Table 1 and FIG. 1.

TABLE 1

| | Target Metal to be Analyzed | Dissolution Quantity (mg/L) |
|---|---|---|
| Comparative Example 1 | Ru | 0.81 |
| Example 1 | Y | 0 |
| Example 2 | Hf | 0 |
| Example 3 | Ta | 0 |

As can be seen from Table 1, the electrodes including the Y—, Hf—, and Ta-based oxides, respectively, used in Examples 1 to 3 were not dissolved in an aqueous solution of a strong base, whereas the Ru-based oxide in Comparative Example 1 was dissolved in the strong base aqueous solution (e.g., a lithium aqueous solution). Thus, it was confirmed that the materials used in Examples 1 to 3 were stable in the presence of a strong base.

Manufacture of Lithium-Air Battery

Example 4

A separator (Celgard 3501) was disposed on a lithium metal foil anode.

0.2 mL of an electrolyte solution having 1 M LiTFSI (lithium bis(trifluoromethanesulfonyl)imide) dissolved in propylene carbonate(PC) was injected to a separator to prepare an anode intermediate layer.

A lithium-aluminum titanium phosphate (LATP) solid electrolyte layer (250 μm in thickness, Ohara Corp., Japan) was arranged on the separator to prepare a lower structure including anode/anode intermediate layer/solid electrolyte layer.

The lower structure was covered by a pouch having aluminum coated on a polyolefin film. A window having a predetermined size was installed at a top end of the pouch to allow the LATP solid electrolyte to be exposed to the outside of the pouch.

The cathode prepared in Example 1 was arranged on the exposed LATP solid electrolyte. Next, a gas diffusion layer (GDL) (SGL, 25BC) was arranged on the cathode, a nickel mesh was arranged on the GDL, a space between the cathode and the GDL was filled with air including moisture and oxygen, a pressing member was then arranged on the nickel mesh to press a resulting cell so as to allow the air to be transferred to the cathode, thereby manufacturing a lithium-air battery.

Examples 5 and 6 and Comparative Example 2

A lithium-air battery was manufactured in the same manner as in Example 4, instead of the cathodes prepared in Examples 2 to 3 and Comparative Example 1 were used.

Evaluation Example 2: Evaluation of Lithium-Air Batteries

Charge and discharge were performed in an oxygen atmosphere of 40° C., 1 atm, and relative humidity of 100%.

The lithium-air batteries manufactured in Examples 4 to 6 were subjected to 10 times repeated charge-discharge cycles of discharge and charge with a constant current of 0.05 mA/cm$^2$ for 10 hours.

Figure 2:
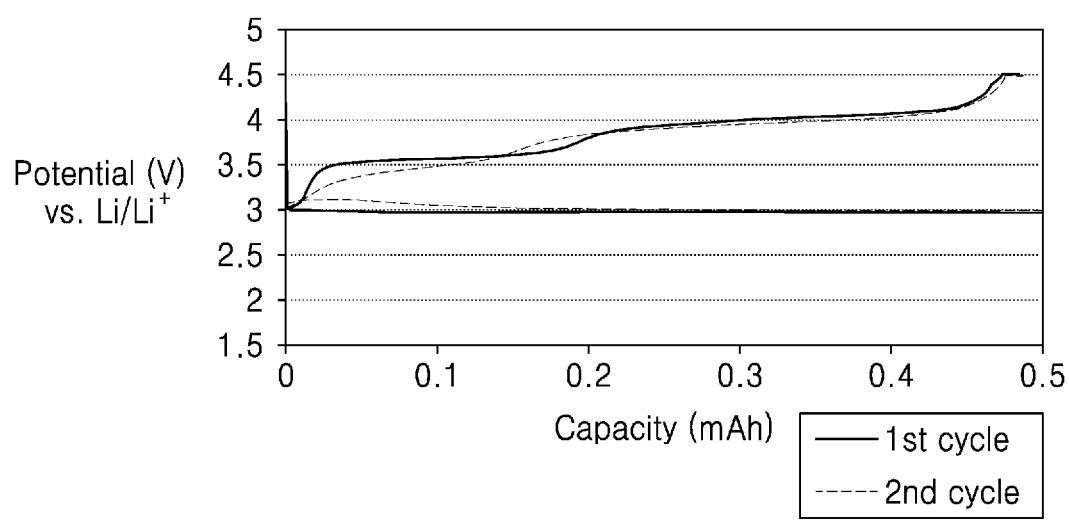
FIG. 2 is a graph of potential (volts (V) vs Li/Li$^+$) versus capacity (milliampere hour, mAh) showing charge-discharge cycle test results for first and second cycles in a lithium-air battery manufactured in Example 4.
Figure 3:
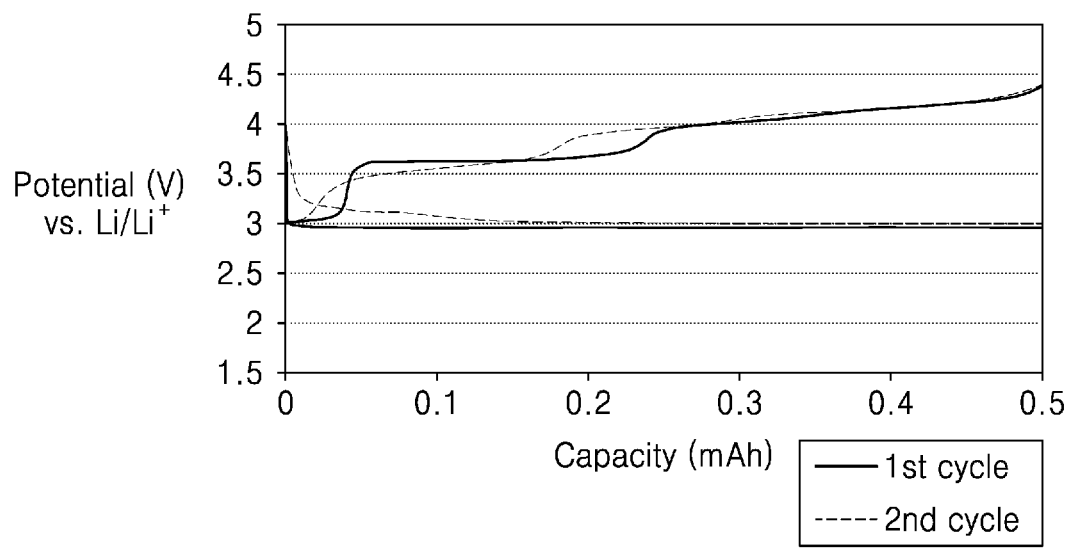
FIG. 3 is a graph of potential ((V) vs Li/Li$^+$) versus capacity (mAh) showing charge-discharge cycle test results for first and second cycles in a lithium-air battery manufactured in Example 5.
Figure 4:
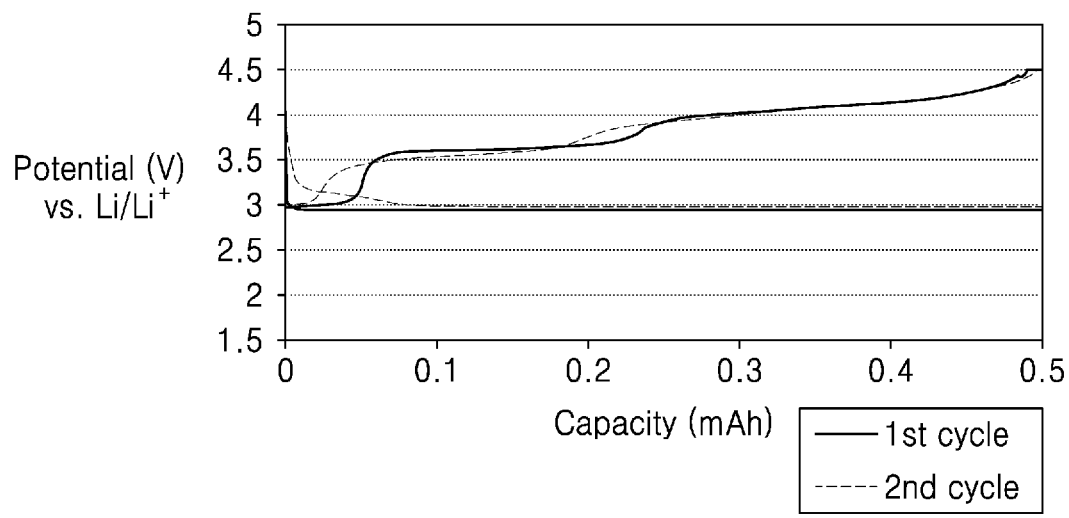
FIG. 4 is a graph of potential ((V) vs Li/Li$^+$) versus capacity (mAh) showing charge-discharge cycle test results for first and second cycles in a lithium-air battery manufactured in Example 6.

Charge-discharge cycle test results for first and second cycles are shown in FIG. 2 (Example 4), FIG. 3 (Example 5), and FIG. 4 (Example 6), respectively. As shown in FIGS. 2 to 4, the lithium-air batteries employing the cathodes, each including a base-resistant compound, prepared in Examples 4 to 6 showed charge-discharge curves exhibiting no short-circuit, confirming that the cathode including a base-resistant compound could be used for a lithium-air battery using air including moisture and oxygen as a cathode active material.

Evaluation Example 3: XRD Evaluation of Base-Resistant Compounds After Charge-Discharge Cycles of Lithium-Air Batteries XRD spectrums for the base-resistant cathode materials ($Y_2O_3$ and $HfO_2$) used in Examples 1 and 2 were measured, and XRD spectrums for the base-resistant cathode materials ($Y_2O_3$ and $HfO_2$) used in Examples 4 and 5 were measured after performing 10 times charge-discharge cycles of Evaluation Example 2. The measurement results are shown in FIG. 5 ($Y_2O_3$) and FIG. 6 ($HfO_2$), respectively.

In addition, XRD spectrums for the cathode material (Ru-based oxide) used in Comparative Example 1 were measured, and XRD spectrums for the cathode material (Ru-based oxide) included in the cathode of Comparative Example 2 were measured after performing 10 charge-discharge cycles of Evaluation Example 2. The measurement results are shown in FIG. 7.

Figure 5:
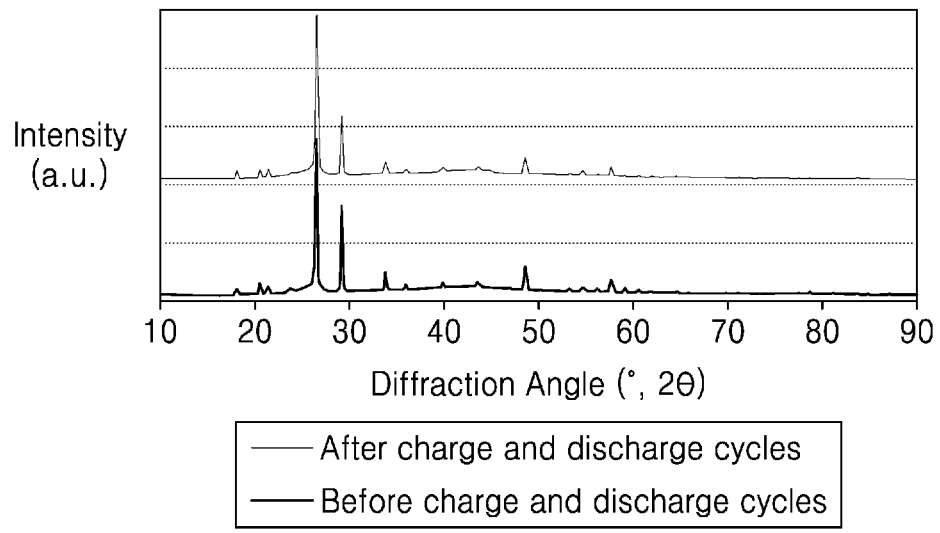
FIG. 5 is a graph of intensity (arbitrary units, a.u.) versus diffraction angle (° 2Θ) of a cathode material of the lithium-air battery manufactured in Example 4, as determined after 10 charge-discharge cycles, when analyzed by X-ray diffraction using CuKα radiation.
Figure 6:
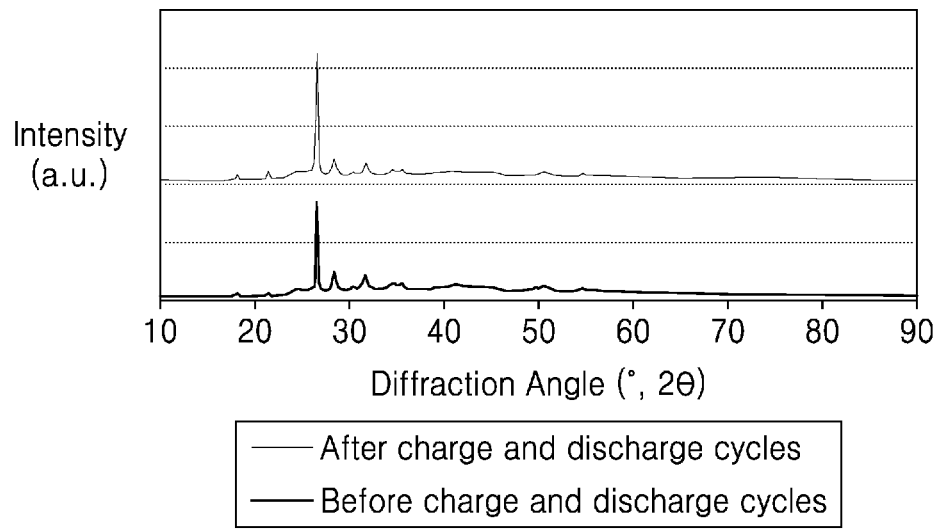
FIG. 6 is a graph of intensity (arbitrary units, a.u) versus diffraction angle (°2Θ) of a cathode material of the lithium-air battery manufactured in Example 5, as determined after 10 charge-discharge cycles, when analyzed by X-ray diffraction using CuKα radiation.
Figure 7:
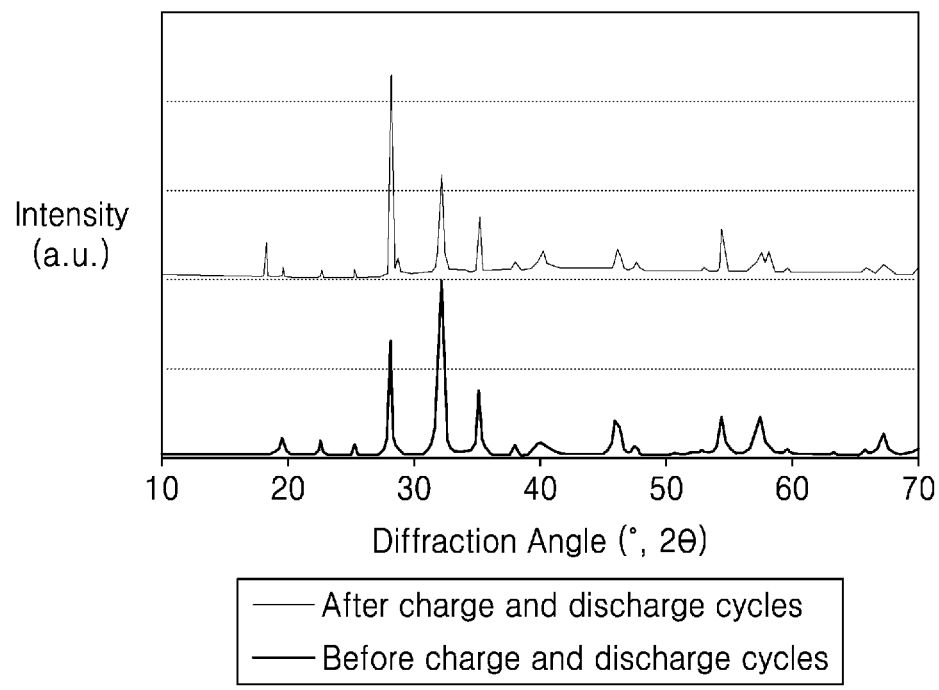
FIG. 7 is a graph of intensity (arbitrary units, a.u) versus diffraction angle (°2Θ) of a cathode material of a lithium-air battery manufactured in Comparative Example 2, as determined after 10 charge-discharge cycles, when analyzed by X-ray diffraction using CuKα radiation.

Referring to FIGS. 5 to 7, no crystallographic changes in the base-resistant compounds were observed from the lithium-air batteries employing the cathodes including the base-resistant compounds even after performing 10 charge-discharge cycles, confirming that the lithium-air batteries had structural stability. By contrast, the cathode material used in Comparative Example 1 was deteriorated by a discharge product (e.g., LiOH) during the repeated charge-discharge cycles, exhibiting a reduction in the perovskite peak and an increase in the $RuO_2$ peak, suggesting that the discharge product led to disintegration of a crystal structure of the cathode material.

According to an aspect, by including a base-resistant compound in the cathode, electrochemical stabilities of a cathode and a lithium-air battery including the same may be improved.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode for an air battery, the cathode comprising:
   a porous conductive material; and
   a base-resistant compound on a surface of the porous conductive material, the base-resistant compound having a 0 or positive Gibbs free energy, at 2 V to 4.5 V vs Li/Li$^+$ at a pH of 7 to 14,
   wherein the base-resistant compound comprises at least two or more of K, Be, Mg, Ca, Sr, Ba, Sc, Hf, Nb, Ta, W, Cd, B, Al, Ga, In, Si, Ge, Sn, P, As, Sb, Bi, O, S, Te, F, Pr, Nd, Sm, Eu, Gd, Tb, Dy, Ho, Er, Tm, Yb, Lu, Th, U, or Pu,
   wherein the cathode comprises the base-resistant compound in an amount of 60 parts by weight and to less than 100 parts by weight, based on 100 parts by weight of the cathode.

2. The cathode of claim 1, wherein the base-resistant compound is electrochemically stable at a pH of 9 to 14.

3. The cathode of claim 1, wherein the base-resistant compound has a Gibbs free energy difference (ΔG) of at least 0 eV under a voltage condition of 2 V to 4.5 V vs Li/Li$^+$.

4. The cathode of claim 1, wherein the base-resistant compound is electrochemically stable with respect to lithium metal at a voltage of 2 V to 4.5 V vs Li/Li$^+$ at a pH of 12 to 14.

5. The cathode of claim 1, wherein the base-resistant compound has oxidation resistance and reduction resistance with respect to lithium metal at a voltage of 2 V to 4.5 V vs Li/Li$^+$ at a pH of 12 to 14.

6. The cathode of claim 1, wherein the base-resistant compound comprises at least one of a binary compound or a ternary compound.

7. The cathode of claim 1, wherein the base-resistant compound is represented by Chemical Formula 1:

$$M1_\alpha X1_\beta \qquad \text{Chemical Formula 1}$$

wherein in Chemical Formula 1, M1 is at least one of K, Be, Mg, Ca, Sr, Ba, Sc, Hf, Nb, Ta, W, Cd, B, Al, Ga, In, Si, Ge, Sn, P, As, Sb, Bi, S, Te, Pr, Nd, Sm, Eu, Gd, Tb, Dy, Ho, Er, Tm, Yb, Lu, Th, U, or Pu, X1 is at least one of O or F, and 0≤α≤32 and 0<β≤68.

8. The cathode of claim 1, wherein the base-resistant compound is represented by at least one of Chemical Formula 2 or Chemical Formula 3:

$$M2_{a1} X2_{b1} \qquad \text{Chemical Formula 2}$$

wherein in Chemical Formula 2,

M2 is at least one of Be, Sc, Hf, Ta, In, Sn, Nd, Sm, Eu, Gd, Tb, Dy, Ho, Er, Tm, Yb, Lu, Th, U, or Pu, X2 is at least one of O or F, and 0≤a12, and 0<b1≤5, $$M3_{a2} M4_{a3} X3_{b2} \qquad \text{Chemical Formula 3}$$

wherein in Chemical Formula 3, each of M3 and M4 are independently at least one of K, Mg, Ca, Sr, Ba, Sc, Y, Hf, Nb, Ta, Mo, W, Cd, B, Al, Ga, In, C, Si, Ge, Sn, P, As, Sb, Bi, S, Te, Pr, Nd, Sm, Eu, Gd, Tb, Dy, Ho, Er, Tm, Yb, Lu, Th, or U, X3 is at least one of O or F, and 0<a2≤29, 0≤a3≤29, and 0≤b2≤68, provided that M3 is not the same as M4.

9. The cathode of claim 1, wherein the base-resistant compound is represented by Chemical Formula 4:

$$M3'_{a2'} M4'_{a3'} X3'_{b2'} \qquad \text{Chemical Formula 4}$$

wherein in Chemical Formula 4,

M3' is at least one of K, Mg, Ca, Sr, Ba, Sc, Ta, Cd, Al, Pr, Nd, Sm, Eu, Gd, Tb, Dy, Ho, Er, Tm, Yb, Lu, Th, or U, M4' is at least one of Sc, Y, Ti, Zr, Hf, Nb, Ta, Mo, W, Fe, Zn, Cd, B, Al, Ga, In, C, Si, Ge, Sn, P, As, Sb, Bi, S, Te, Ho, Tm, Th, or U, X3' is at least one of O or F, 0≤a2'≤29, 0≤a3'≤25, and 0≤b2'≤68.

10. The cathode of claim 9, wherein when a3' is 0, and X3' comprises 0 and F.

11. A cathode for an air battery comprising:

a porous conductive material; and a base-resistant compound on a surface of the porous conductive material, the base-resistance compound having a 0 or positive Gibbs free energy, at 2 V to 4.5 V vs Li/Li$^+$ at a pH of 7 to 14, wherein the base-resistant compound comprises at least one of HfO$_2$, Ta$_2$O$_5$, Nd$_2$O$_3$, PuO$_2$, Tb$_2$O$_3$, Dy$_2$O$_3$, Gd$_2$O$_3$, Sm$_2$O$_3$, Ho$_2$O$_3$, Er$_2$O$_3$, Sc$_2$O$_3$, Tm$_2$O$_3$, Lu$_2$O$_3$, ThO$_2$, UO$_3$, Eu$_2$O$_3$, In$_2$O$_3$, BeO, SnO$_2$, YbF$_2$, Al$_2$ZnO$_4$, BaTa$_2$O$_6$, BaUO$_4$, CaTa$_2$O$_6$, CaUO$_4$, Cd(GaO$_2$)$_2$, Cd$_2$Sb$_2$O$_7$, CdIn$_2$O$_4$, CdSnO$_3$, CeTh$_9$O$_2$O, Dy$_{11}$Y$_5$O$_{24}$, Dy$_{29}$Y$_3$O$_{48}$, Dy$_2$CO$_5$, Dy$_2$GeO$_5$, Dy$_2$Hf$_2$O$_7$, Dy$_2$SiO$_5$, Dy$_2$Sn$_2$O$_7$, Dy$_2$Ti$_2$O$_7$, Dy$_2$WO$_6$, Dy$_2$Zr$_8$O$_{19}$, Dy$_3$Al$_5$O$_{12}$, Dy$_3$Ga$_5$O$_{12}$, Dy$_3$GaO$_6$, Dy$_3$Y$_5$O$_{12}$, DyAsO$_4$, DyNbO$_4$, DyOF, DyPO$_4$, DyTaO$_4$, DyY$_3$O$_6$, DyY$_7$O$_{12}$, Er$_{10}$W$_2$O$_{21}$, Er$_2$GeO$_5$, Er$_2$SiO$_5$, Er$_2$Sn$_2$O$_7$, Er$_2$TiO$_5$, Er$_3$Al$_5$O$_{12}$, Er$_3$Ga$_5$O$_{12}$, Er$_4$Zr$_3$O$_{12}$, ErAsO$_4$, ErBO$_3$, ErNbO$_4$, ErPO$_4$, ErTaO$_4$, Eu$_2$Hf$_2$O$_7$, Eu$_2$SiO$_5$, Eu$_2$Sn$_2$O$_7$, Eu$_3$Ga$_5$O$_{12}$, Eu$_3$GaO$_6$, Eu$_3$NbO$_7$, Eu$_6$WO$_{12}$, EuOF, Gd$_2$GeO$_5$, Gd$_2$Hf$_2$O$_7$, Gd$_2$MoO$_6$, Gd$_2$SiO$_5$, Gd$_2$Sn$_2$O$_7$, Gd$_2$TiO$_5$, Gd$_3$Al$_5$O$_{12}$, Gd$_3$Ga$_5$O$_{12}$, Gd$_3$GaO$_6$, Gd$_3$SbO$_7$, Gd$_3$Y$_{13}$O$_{24}$, Gd$_3$Y$_5$O$_{12}$, Gd$_5$Y$_3$O$_{12}$, Gd$_6$WO$_{12}$, GdAsO$_4$, GdInO$_3$, GdNbO$_4$, GdOF, GdPO$_4$, GdTaO$_4$, Ho$_2$SiO$_5$, Ho$_2$Sn$_2$O$_7$, Ho$_2$Ti$_2$O$_7$, Ho$_2$WO$_6$, Ho$_2$Zr$_8$O$_{19}$, Ho$_3$Al$_5$O$_{12}$, Ho$_3$Ga$_5$O$_{12}$, Ho$_3$GaO$_6$, Ho$_3$ScO$_6$, HoAsO$_4$, HoBO$_3$, HoNbO$_4$, HoOF, HoPO$_4$, HoTaO$_4$, KTa$_5$O$_{13}$, La$_2$CO$_5$, La$_2$GeO$_5$, La$_2$Hf$_2$O$_7$, La$_2$MoO$_6$, La$_2$Si$_2$O$_7$, La$_2$Sn$_2$O$_7$, La$_2$SO$_6$, La$_2$TeO$_6$, La$_2$Th$_8$O$_{19}$, La$_2$Ti$_2$O$_7$, La$_2$UO$_6$, La$_2$WO$_6$, La$_2$Zr$_2$O$_7$, La$_3$Ga$_5$O$_{12}$, La$_4$Ga$_2$O$_9$, LaAlO$_3$, LaAsO$_4$, LaBO$_3$, LaNbO$_4$, LaOF, LaPO$_4$, LaSbO$_4$, LaScO$_3$, LaTaO$_4$, Lu$_2$SiO$_5$, Lu$_2$Sn$_2$O$_7$, Lu$_2$TiO$_5$, Lu$_4$Hf$_3$O$_{12}$, Lu$_4$Zr$_3$O$_{12}$, Lu$_6$WO$_{12}$, Lu$_6$WO$_{12}$, LuGaO$_3$, LuNbO$_4$, LuSbO$_4$, LuTaO$_4$, Mg(GaO$_2$)$_2$, MgTa$_2$O$_6$, MgTi$_2$O$_5$, Nd$_2$GeO$_5$, Nd$_2$Hf$_2$O$_7$, Nd$_2$MoO$_6$, Nd$_2$SiO$_5$, Nd$_2$Sn$_2$O$_7$, Nd$_2$TeO$_6$, Nd$_2$Ti$_2$O$_7$, Nd$_2$WO$_6$, Nd$_2$Zr$_8$O$_{19}$, Nd$_3$Ga$_5$O$_{12}$, Nd$_3$GaO$_6$, Nd$_3$U$_2$O$_{10}$, Nd$_4$Ga$_2$O$_9$, NdAlO$_3$, NdAsO$_4$, NdBO$_3$, NdFeO$_3$, NdNbO$_4$, NdOF, NdPO$_4$, NdSbO$_4$, NdScO$_3$, NdTaO$_4$, PrTaO$_4$, Sc$_2$Ti$_2$O$_7$, ScTaO$_4$, Sm$_{27}$Y$_5$O$_{48}$, Sm$_2$Ge$_2$O$_7$, Sm$_2$Hf$_2$O$_7$, Sm$_2$MoO$_6$, Sm$_2$SiO$_5$, Sm$_2$Sn$_2$O$_7$, Sm$_2$TeO$_6$, Sm$_2$Th$_8$O$_{19}$, Sm$_2$TiO$_5$, Sm$_2$WO$_6$, Sm$_2$Zr$_8$O$_{19}$, Sm$_3$Ga$_5$O$_{12}$, Sm$_3$GaO$_6$, SmAlO$_3$, SmAsO$_4$, SmBO$_3$, SmNbO$_4$, SmOF, SmPO$_4$, SmSbO$_4$, SmScO$_3$, SmTaO$_4$, SmY$_{15}$O$_{24}$, Sr$_3$U$_{11}$O$_{36}$, SrTa$_2$O$_6$, Ta$_{12}$MoO$_{33}$, Ta$_2$Cd$_2$O$_7$, Ta$_2$Zn$_3$O$_8$, Ta$_2$ZnO$_6$, TaAlO$_4$, TaBiO$_4$, TaInO$_4$, Tb$_2$Ge$_2$O$_7$, Tb$_2$SiO$_5$, Tb$_2$Sn$_2$O$_7$, Tb$_2$Ti$_2$O$_7$, Tb$_2$WO$_6$, Tb$_2$Zr$_8$O$_{19}$, Tb$_3$Al$_5$O$_{12}$, Tb$_3$Ga$_5$O$_{12}$, Tb$_3$GaO$_6$, TbAsO$_4$, TbNbO$_4$, TbOF, TbPO$_4$, TbTaO$_4$, Ti$_3$Zn$_2$O$_8$, TiCdO$_3$, Tm$_2$Si$_2$O$_7$, Tm$_2$Sn$_2$O$_7$, Tm$_2$Ti$_2$O$_7$, Tm$_2$Zr$_8$O$_{19}$, Tm$_3$Al$_5$O$_{12}$, Tm$_3$Ga$_5$O$_{12}$, Tm$_6$WO$_{12}$, TmNbO$_4$, TmOF, TmPO$_4$, TmTaO$_4$, UCdO$_4$, Y$_{11}$Tm$_5$O$_{24}$, Y$_{13}$Ho$_{19}$O$_{48}$, Y$_{13}$Ho$_3$O$_{24}$, Y$_{13}$Tm$_3$O$_{24}$, Y$_{15}$TmO$_{24}$, Y$_2$GeO$_5$, Y$_2$Hf$_2$O$_7$, Y$_2$HfO$_5$, Y$_2$SiO$_5$, Y$_2$Sn$_2$O$_7$, Y$_2$Th$_8$O$_{19}$, Y$_2$TiO$_5$, Y$_2$Zr$_8$O$_{19}$, Y$_3$Al$_5$O$_{12}$, Y$_3$Ga$_5$O$_{12}$, Y$_3$GaO$_6$, Y$_3$SbO$_7$, Y$_5$Tm$_{11}$O$_{24}$, Y$_6$WO$_{12}$, Y$_7$HoO$_{12}$, Y$_7$TmO$_{12}$, YAsO$_4$, Yb$_4$Ta$_{25}$O$_{68}$, YbCO$_3$, YbO$_3$, YbTiO$_3$, YNbO$_4$, YOF, YPO$_4$, YTaO$_4$, Zn(GaO$_2$)$_2$, or Zr$_8$Sc$_2$O$_{19}$, wherein the cathode comprises the base-resistant compound in an amount of 60 parts by weight to less than 100 parts by weight, based on 100 parts by weight of the cathode.

12. The cathode of claim 1, wherein the cathode comprises the base-resistant compound in an amount of 70 parts by weight to less than 100 parts by weight, based on 100 parts by weight of the cathode.

13. The cathode of claim 1, wherein the air comprises between 1 volume percent to 100 volume percent of the moisture, based on a total volume of the air.

14. A lithium-air battery comprising:
the cathode according to claim 1;
an anode comprising lithium metal; and
an electrolyte disposed between the cathode and the anode.

15. The lithium-air battery of claim 14, wherein the cathode is inert in the presence of a discharge product having a pH of 9 to 14.

16. The lithium-air battery of claim 15, wherein the discharge product comprises LiOH.

17. The lithium-air battery of claim 14, wherein the electrolyte comprises a solid electrolyte.

18. The lithium-air battery of claim 14, wherein the cathode further comprises a porous layer, and
the porous layer comprises the base-resistant compound.

19. A method of preparing the cathode of claim 1, the method comprising:
providing a composition comprising the base-resistant compound and the porous conductive material;
molding the composition to prepare a sheet; and
heat-treating the sheet under an oxidizing atmosphere at a temperature of about 900° C. to about 1300° C. to form the cathode.

20. The method of claim 19, wherein the molding of the sheet further comprises:
coating the composition on a substrate to form a coating layer;
drying the coating layer to form a dried coating layer; and
stacking and laminating a plurality of the dried coating layers to prepare the sheet.

21. A cathode for an air battery, the cathode comprising:
a porous conductive material; and
a base-resistant compound on a surface of the porous conductive material, wherein the base-resistant compound comprises at least one of $Dy_2O_3$, $Er_2O_3$, $Gd_2O_3$, $HfO_2$, $Ho_2O_3$, $Lu_2O_3$, $Nd_2O_3$, $PuO_2$, $Sc_2O_3$, $Sm_2O_3$, $Ta_2O_5$, $Tb_2O_3$, $ThO_2$, or $Tm_2O_3$,
wherein the cathode comprises the base-resistant compound in an amount of 60 parts by weight to less than 100 parts by weight, based on 100 parts by weight of the cathode.

* * * * *